(12) United States Patent
Rodzevski et al.

(10) Patent No.: US 9,462,455 B2
(45) Date of Patent: Oct. 4, 2016

(54) DYNAMIC USER RECOMMENDATIONS FOR BAN ENABLED MEDIA EXPERIENCES

(71) Applicant: Sony Corporation, Tokyo (JP)

(72) Inventors: Aleksandar Rodzevski, Malmö (SE); Thomas Bolin, Lund (SE); Henrik Bengtsson, Lund (SE); Erik Bengtsson, Eslöv (SE); Kristian Tärnhed, Lund (SE); Malin Larsson, Malmö (SE); Ola Thörn, Limhamn (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/537,984

(22) Filed: Nov. 11, 2014

(65) Prior Publication Data

US 2016/0135036 A1 May 12, 2016

(51) Int. Cl.
*H04W 8/20* (2009.01)
*H04W 4/00* (2009.01)
*H04W 4/18* (2009.01)
*H04H 60/45* (2008.01)
*H04B 13/00* (2006.01)
*H04H 60/46* (2008.01)

(52) U.S. Cl.
CPC ............ *H04W 8/205* (2013.01); *H04H 60/45* (2013.01); *H04W 4/008* (2013.01); *H04W 4/18* (2013.01); *H04B 13/005* (2013.01); *H04H 60/46* (2013.01)

(58) Field of Classification Search
CPC .................................................... H04W 84/18
USPC ....................................................... 455/41.2
See application file for complete search history.

(56) References Cited

U.S. PATENT DOCUMENTS 6,365,618 B1 * 4/2002 Swartz .................. A61K 31/40
514/411
6,580,356 B1 6/2003 Alt et al.
(Continued)

FOREIGN PATENT DOCUMENTS

EP 2018038 1/2009
EP 2378748 10/2011
(Continued)

OTHER PUBLICATIONS

Jongtaek Oh et al.: "Personal environment service based on the integration of mobile communications and wireless personal area networks", IEEE Communications Magazine, vol. 48, No. 6, Jun. 1, 2010, pp. 66-72.
(Continued)

*Primary Examiner* — Hai V Nguyen
(74) *Attorney, Agent, or Firm* — Tucker Ellis LLP

(57) ABSTRACT

Disclosed is a method, performed in a Body Area Network (BAN) enabled media experience device for enabling transmission of a media experience according to a stored, predefined user configuration associated with an identification data, userID, of a BAN enabled communication device, the method comprising: establishing a connection between the BAN enabled media experience device and the BAN enabled communication device by using BAN; retrieving the identification data, userID, of the BAN enabled communication device; retrieving the stored, predefined user configuration associated with the userID of the BAN enabled communication device; and initiating transmission of the media experience by the BAN enabled media experience device according to the stored, predefined user configuration.

20 Claims, 7 Drawing Sheets

(56) References Cited

U.S. PATENT DOCUMENTS

| | | | | |
|---|---|---|---|---|
| 7,147,876 B2* | 12/2006 | Riley | A61K 8/67 | 424/725 |
| 7,202,773 B1 | 4/2007 | Oba et al. | | |
| 7,205,177 B2* | 4/2007 | De Raedt | H01L 23/3128 | 228/180.21 |
| 7,313,591 B2* | 12/2007 | Eames | G06F 17/30749 | 707/E17.102 |
| 7,428,572 B2* | 9/2008 | Eames | G06F 17/30749 | 707/999.102 |
| 7,687,904 B2* | 3/2010 | De Raedt | H01L 23/3128 | 228/180.22 |
| 7,762,470 B2* | 7/2010 | Finn | G06K 7/0004 | 235/380 |
| 8,155,367 B2* | 4/2012 | Singh | H04M 1/0258 | 379/433.02 |
| 8,253,693 B2* | 8/2012 | Buil | H04B 13/005 | 345/1.1 |
| 8,265,326 B2* | 9/2012 | Singh | H04M 1/0258 | 379/433.02 |
| 8,433,243 B2* | 4/2013 | Sharma | H04M 1/05 | 455/41.2 |
| 8,433,815 B2* | 4/2013 | van Coppenolle | G06Q 30/06 | 709/235 |
| 8,527,525 B2* | 9/2013 | Fong | G06F 17/30867 | 707/751 |
| 8,639,185 B2* | 1/2014 | Hebiguchi | H04B 13/005 | 455/100 |
| 8,658,622 B2* | 2/2014 | Demetriou | A01K 67/0275 | 435/15 |
| 8,706,038 B2* | 4/2014 | Sharma | H04M 1/05 | 455/41.2 |
| 8,862,691 B2* | 10/2014 | Aroner | G06F 17/30029 | 707/732 |
| 8,867,995 B2* | 10/2014 | Kim | H04B 13/005 | 345/163 |
| 8,908,894 B2* | 12/2014 | Amento | H04K 1/00 | 381/151 |
| 8,923,685 B2* | 12/2014 | Roberts | H04N 21/23103 | 386/295 |
| 9,171,090 B2* | 10/2015 | Nikain | H04N 21/8133 | |
| 9,171,201 B2* | 10/2015 | Lake, II | G06Q 50/22 | |
| 2004/0003090 A1* | 1/2004 | Deeds | H04L 65/4076 | 709/227 |
| 2005/0008148 A1 | 1/2005 | Jacobson | | |
| 2005/0015551 A1* | 1/2005 | Eames | G06F 17/30749 | 711/118 |
| 2005/0243061 A1 | 11/2005 | Liberty et al. | | |
| 2006/0012037 A1* | 1/2006 | Raedt | H01L 23/3128 | 257/737 |
| 2006/0020879 A1* | 1/2006 | Eames | G06F 17/30749 | 715/234 |
| 2006/0026376 A1* | 2/2006 | LaChapelle | G11B 19/025 | 711/170 |
| 2006/0026634 A1* | 2/2006 | LaChapelle | G11B 19/025 | 725/34 |
| 2006/0149704 A1* | 7/2006 | Wyatt | G06F 17/30017 | |
| 2007/0130015 A1* | 6/2007 | Starr | G06Q 30/02 | 705/14.46 |
| 2007/0145119 A1 | 6/2007 | Rhelimi | | |
| 2007/0182012 A1* | 8/2007 | DeRaedt | H01L 23/3128 | 257/738 |
| 2007/0282783 A1 | 12/2007 | Singh | | |
| 2008/0162668 A1* | 7/2008 | Miller | H04L 65/40 | 709/219 |
| 2008/0259043 A1* | 10/2008 | Buil | H04B 13/005 | 345/173 |
| 2008/0299231 A1* | 12/2008 | Xia | A61K 36/487 | 424/725 |
| 2009/0094681 A1 | 4/2009 | Sadler et al. | | |
| 2009/0099130 A1* | 4/2009 | Demetriou | A01K 67/0275 | 514/62 |
| 2010/0162172 A1* | 6/2010 | Aroner | G06F 17/30058 | 715/838 |
| 2010/0277435 A1 | 11/2010 | Han et al. | | |
| 2011/0093820 A1* | 4/2011 | Zhang | A63F 13/06 | 715/863 |
| 2011/0205156 A1 | 8/2011 | Gomez et al. | | |
| 2011/0246123 A1* | 10/2011 | DelloStritto | A61B 5/11 | 702/141 |
| 2011/0271007 A1* | 11/2011 | Wang | H04L 45/306 | 709/238 |
| 2011/0282662 A1* | 11/2011 | Aonuma | G10L 17/26 | 704/231 |
| 2011/0293251 A1* | 12/2011 | Roberts | H04N 21/23103 | 386/295 |
| 2012/0026129 A1 | 2/2012 | Kawakami | | |
| 2012/0159337 A1* | 6/2012 | Travilla | G06Q 30/0631 | 715/738 |
| 2012/0249409 A1 | 10/2012 | Toney et al. | | |
| 2012/0284757 A1* | 11/2012 | Rajapakse | H04N 21/41407 | 725/81 |
| 2012/0324368 A1 | 12/2012 | Putz et al. | | |
| 2013/0017789 A1 | 1/2013 | Chi et al. | | |
| 2013/0073615 A1* | 3/2013 | Hall | H04L 67/306 | 709/203 |
| 2013/0103814 A1* | 4/2013 | Carrasco | H04L 65/00 | 709/223 |
| 2013/0174049 A1 | 7/2013 | Townsend et al. | | |
| 2013/0205021 A1* | 8/2013 | Hall | H04W 24/08 | 709/224 |
| 2013/0225915 A1* | 8/2013 | Redfield | A61N 5/0618 | 600/28 |
| 2013/0245796 A1* | 9/2013 | Lentzitzky | H04L 65/60 | 700/90 |
| 2013/0246632 A1* | 9/2013 | Ginde | H04L 65/1006 | 709/227 |
| 2013/0297217 A1* | 11/2013 | Bangera | G06F 19/345 | 702/19 |
| 2013/0332469 A1* | 12/2013 | Nakamura | G06F 17/30283 | 707/748 |
| 2014/0085050 A1 | 3/2014 | Luna | | |
| 2014/0111687 A1* | 4/2014 | Difrancesco | H04N 21/25891 | 348/468 |
| 2014/0112506 A1* | 4/2014 | Hopkins | H04N 21/4223 | 381/306 |
| 2014/0129630 A1* | 5/2014 | Nikain | H04N 21/8133 | 709/204 |
| 2014/0168135 A1* | 6/2014 | Saukko | G06F 1/1684 | 345/174 |
| 2014/0228313 A1* | 8/2014 | Demetriou | A01K 67/0275 | 514/51 |
| 2014/0297799 A1* | 10/2014 | Gordon | H04N 21/4384 | 709/217 |
| 2015/0067708 A1* | 3/2015 | Jensen | H04N 21/4756 | 725/10 |
| 2015/0100883 A1* | 4/2015 | Kern | H04L 65/60 | 715/716 |
| 2015/0119652 A1* | 4/2015 | Hyde | A61B 5/0022 | 600/301 |
| 2015/0162994 A1* | 6/2015 | Rodzevski | G07C 9/00309 | 455/39 |
| 2015/0163221 A1* | 6/2015 | Bolin | G07C 9/00309 | 726/7 |
| 2015/0186929 A1* | 7/2015 | Thies | G06Q 30/0246 | 705/14.45 |
| 2015/0304712 A1* | 10/2015 | Liu | H04N 21/472 | 348/734 |
| 2015/0317515 A1* | 11/2015 | Lake, II | G06Q 50/22 | 700/91 |
| 2016/0014174 A1* | 1/2016 | Nikain | H04N 21/8133 | 725/40 |
| 2016/0029422 A1* | 1/2016 | Thorn | H04W 76/023 | 455/39 |
| 2016/0129248 A1* | 5/2016 | Creasey | A61N 1/0476 | 607/40 |

FOREIGN PATENT DOCUMENTS

| | | |
|---|---|---|
| EP | 2600319 | 6/2013 |
| EP | 2747370 | 6/2014 |

(56) References Cited

FOREIGN PATENT DOCUMENTS

| JP | 2008073462 | 4/2008 |
|----|------------|--------|
| JP | 2009049951 | 3/2009 |
| WO | WO 2011/021531 | 2/2011 |

OTHER PUBLICATIONS

Matsushita N. et al.: "Wearable key: device for personalizing nearby environment", Wearable Computers, IEEE Comput. Soc, US, Oct. 16, 2000, pp. 119-126.

Ruiz J A et al.: "Novel communication services based on human body and environment interaction: applications inside trains and applications for handicapped people", Wireless Communications and Networking Conference, 2006, Apr. 3, 2006, pp. 2240-2245.

"What you touch is yours; Smartban (13) 001011_eGO_project", ETSI Draft; Smartban (13) 001011_EGO_Project, European Telecommunications Standards Institute (ETSI), May 28, 2013, pp. 1-19.

International Search Report dated Jul. 15, 2015 for corresponding International Application No. PCT/IB2015/052925.

The NYMI—White Paper (Nov. 19, 2013), pp. 1-28.

\* cited by examiner

```
            userID

Name:_____
Age:_____
Language:_____
Country:_____
TV shows:_____
Setup box shows:_____
Preferences:_____
Recommendation:_____
            ...
            ...
            ...
```

Fig 6

DYNAMIC USER RECOMMENDATIONS FOR BAN ENABLED MEDIA EXPERIENCES

TECHNICAL FIELD

The present invention relates to a system, a media experience device and a method for data transfer close to a person's body, which media experience device is an electronic media experience device adapted for both wireless and Body Coupled Communication, BCC, with at least one further electronic communication device creating a system in a Body Area Network, BAN. Specially, the invention relates to a BAN enabled electronic communication media experience device and a method for securing interaction with a BAN enabled electronic communication device. In particular, the invention relates to a method, performed in a Body Area Network, BAN, enabled media experience device configured for enabling transmission of a media experience according to a stored, predefined user configuration associated with an identification data, userID, of a BAN enabled communication device.

BACKGROUND ART

Conventional internet enabled devices are generally connected by being wired to each other or are connected by utilizing different kinds of short range wireless solutions, also referred to as Personal Area Network, PAN using radio-frequency (RF) techniques such as Bluetooth©, infrared Data association (IrDA), ZigBee©, Ultra WideBand (UWB), etc. However, the RF-technique have some drawbacks, e.g. there might be a limited operating time due to relatively high power consumption of the RF transceiver, the risk of interference with other RF systems operating in the same frequency band, and the user is exposed to potentially harmful RF radiation. Moreover, the user needs to manually pair the internet enabled devices, e.g. a wristlet with a mobile phone, in order to establish a RF connection between them.

There is a need for faster, easier and more intuitive ways of securing interaction for a user with various media experience devices and with electronic devices by means of easy and convenient methods.

SUMMARY OF THE INVENTION

An aspect of the present disclosure is to provide a solution which seeks to mitigate, alleviate, or eliminate one or more of the above and below identified deficiencies in the art and disadvantages singly or in any combination.

Disclosed is a method, performed in a Body Area Network, BAN, enabled media experience device configured for enabling transmission of a media experience according to a stored, predefined user configuration associated with an identification data, userID, of a BAN enabled communication device, the method comprising:
  establishing a connection between the BAN enabled media experience device and the BAN enabled communication device by using BAN;
  retrieving the identification data, userID, of the BAN enabled communication device;
  retrieving the stored, predefined user configuration associated with the userID of the BAN enabled communication device; and
  initiating transmission of the media experience by the BAN enabled media experience device according to the stored, predefined user configuration.

The BAN enabled media experience device may be a TV, a television, a computer, a laptop, a PC, a gaming console, a tablet, a mobile phone, an interface for streaming content from a web service such as Netflix, HBO etc., where the web service may require a user account, an interface for providing and/or transmitting content from a setup box service, such as Video Unlimited etc.

The media experience may comprise watching of a TV program or a TV show, streaming of a TV show, playing a computer game, gaming, watching advertising, commercials, being presented to products to buy, watching music videos, streaming of a video, of a movie, streaming and/or listening to music, to a radio program, a radio show, surfing on the internet etc.

The BAN enabled communication device may be a body-worn device, a handheld device, an implanted device in the user etc. The BAN enabled communication device may be a watch, a wristlet, a necklace, a ring, a headset, a hearing device, an implant etc.

Establishing a connection between the BAN enabled media experience device and the BAN enabled communication device by using BAN may comprise that the user wearing or holding the BAN enabled communication device touches the BAN enabled media experience device. Alternatively and/or additionally the user should be close to, near to, proximate to, such as within 1 centimeter (cm), 2 cm, 4, cm, 6 cm, 10 cm, 15 cm, 20 cm, 30 cm, 40 cm, 50 cm, 1 meter (m), 2 m, 3 m, 4 m, 5 m etc. of the BAN enabled media experience device.

Thus establishing a connection may comprise the user touching the TV, the computer, the gaming console, and/or the user picking up a remote control for the TV, a joystick for the gaming console etc.

The BAN enabled communication device may be preregistered on a list of allowed BAN enabled communications devices which the media experience device is preconfigured to be connected to. The media experience device may be configured by the provider of the media experience device, e.g. the TV seller, store, vendor, the TV manufacturer, and/or be configured by the user, and/or be configured by the account owner of the web service streamer or the account owner of the setup box service etc.

Retrieving the identification data, userID, of the BAN enabled communication device may comprise retrieving the userID from a remote data storage, such as a remote storage area network, such as in a cloud data storage, and/or from a local storage such as in the BAN enabled communication device.

Retrieving the stored, predefined user configuration associated with the userID of the BAN enabled communication device may comprise retrieving the user configuration from a stored profile in a remote data storage, such as a remote storage area network, such as in a cloud data storage, and/or from a local storage such as in the BAN enabled communication device.

Enabling transmission of a media experience may correspond to configuring, initiating, providing, obtaining etc. transmission.

Initiating transmission of the media experience by the BAN enabled media experience device may comprise starting up, approving, streaming, viewing, showing, displaying, televising, broadcasting, authenticating, decrypting, transmitting, playing etc.

In some embodiments the predefined user configuration comprises the user's media experience preferences.

Media experience preferences may comprise specific TV shows, types of TV shows, TV channels, games, you tube channels, web service streaming TV series or show, TV settings e.g. 4K preference, which is 4K resolution, being a collective term for digital video formats having a horizontal resolution of approximately 4,000 pixels or 4K UHDTV, a high-resolution TV format, stream or streaming performance, types of movies, types of videos, type of music, setup box selections, advertisements, e.g. type of advertisement, length of clips, product type advertised, favourite actors, favourite movies, favourite advertisements, favourite TV shows etc.

In some embodiments initiating transmission of the BAN enabled media experience device comprises providing recommendations according to the stored, predefined user configuration.

Recommendations may be based on age of user, language, country, religion, gender, political position, favourite actors, favourite movies, favourite advertisements, favourite TV shows etc.

Recommendations could be recommendation of TV shows, TV series, computer games, radio programs, pod casts, movies, video clips, music, advertisements, physical items or services etc., where the physical items for example can bought by the user via the display.

Recommendations may be made based on studies and statistics of all or some of the users of the media experience device.

Recommendations may be made or configured by the provider of the BAN enabled media experience device, such as the manufacturer of the BAN enabled TV, and/or by the provider of the media experience, such as by the internet provider, and/or by the web service streaming supplier, and/or by the setup box supplier, and/or by the gaming console supplier, and/or by the user her/himself, by another user etc.

In some embodiments transmission of the media experience by the BAN enabled media experience device, according to the stored, predefined user configuration is configured to stop when:
  the BAN enabled media experience device is turned off or put on standby; and/or
  another user establishes a connection between the BAN enabled media experience device and another BAN enabled communication device associated with another identification data, userID, for enabling transmission of a media experience according to another stored, predefined user configuration, by using BAN; and/or
  the connection between the BAN enabled media experience device and the BAN enabled communication device is turned off or lost; and/or
  a connection between another BAN enabled media experience device and the BAN enabled communication device is established by using BAN.

The BAN enabled media experience device may be termed a first BAN enabled media experience device if there are more than one BAN enabled media experience device or at least a first BAN enabled media experience device.

If there are more users, the user may be termed a first user, and another user may be termed a second user. Correspondingly, the stored, predefined user configuration may be termed a first stored, predefined user configuration, and another stored, predefined user configuration may be termed a second stored, predefined user configuration. Correspondingly, the identification data, userID, may be termed a first identification data, userID, and another identification data, userID may be termed a second identification data, userID.

Correspondingly, the BAN enabled communication device may be termed a first BAN enabled communication device, and another BAN enabled communication device may be termed a second BAN enabled communication device.

Thus, in some embodiments transmission of the media experience by the first BAN enabled media experience device, according to the first stored, predefined user configuration is configured to stop when:
  the first BAN enabled media experience device is turned off or put on standby; and/or
  a second user establishes a connection between the first BAN enabled media experience device and a second BAN enabled communication device associated with a second identification data, userID, for enabling transmission of a media experience according to the second stored, predefined user configuration, by using BAN; and/or
  the connection between the first BAN enabled media experience device and the first BAN enabled communication device is turned off or lost; and/or
  a connection between a second BAN enabled media experience device and the first BAN enabled communication device is established by using BAN.

Thus if another or second user establishes a connection between the BAN enabled media experience device, or the first BAN enabled media experience device, and another or second BAN enabled communication device, the connection between the, e.g. first, BAN enabled communication device and the, e.g. first, BAN enabled media experience device may be discontinued or terminated. The other or second BAN enabled communication device may be connected by the other or second user touching or being near the, e.g. first, BAN enabled media experience device.

The connection between the, e.g. first, BAN enabled media experience device and the, e.g. first, BAN enabled communication device may be turned off or lost, e.g. if the, e.g. first, user leaves the rooms where the, e.g. first, BAN enabled media experience device is placed, as the connection may be lost due to Bluetooth proximity requirements not satisfied and/or WiFi positioning requirements not satisfied, or the, e.g. first, user actively shuts down the connection, e.g. if another or second BAN or NON-BAN user wishes to watch something else on the TV etc.

When the, e.g. first, user establishes a connection between another or second BAN enabled media experience device, such as a gaming console or internet connection, the, e.g. first, BAN enabled communication device may terminate the media experience, such as a TV show.

In some embodiments the method comprises:
  establishing a connection between the BAN enabled media experience device and another BAN enabled communication device by using BAN;
  retrieving identification data, userID, of the other BAN enabled communication device;
  retrieving a stored, predefined shared user configuration associated with the userID of the BAN enabled communication device and the userID of the other BAN enabled communication device; and
  initiating transmission of the media experience by the BAN enabled media experience device according to the stored, predefined shared user configuration.

In some embodiments the method comprises:
  establishing a connection between the first BAN enabled media experience device and a second BAN enabled communication device by using BAN;
  retrieving second identification data, userID, of the second BAN enabled communication device;

retrieving a stored, predefined shared user configuration associated with the first identification data, userID of the first BAN enabled communication device and the second identification data, userID of the second BAN enabled communication device; and initiating transmission of the media experience by the first BAN enabled media experience device according to the stored, predefined shared user configuration.

This may be the case when two BAN enabled communication devices are both connected to the same, first BAN enabled media experience device. For example, the two BAN enabled communication devices may belong to two family members, such as a parent and a child, and the stored, predefined shared user configuration associated with the two userIDs may be a family friendly configuration recommending a family show, which is of interest for both the parent and the child.

The other or second BAN enabled communication device may be on a list of BAN enabled communications devices which the media experience device is preconfigured to be connected to.

The connection between the BAN enabled media experience device and another or second BAN enabled communication device by using BAN may be established by the other or second user touching or being near the media experience device.

The second identification data, userID, of the other or second BAN enabled communication device and/or the stored, predefined shared user configuration associated with the first userID of the BAN enabled communication device and the second userID of the other or second BAN enabled communication device may be retrieved from a remote storage and/or from a local storage.

In some embodiments establishing a connection between the BAN enabled media experience device and the BAN enabled communication device by using BAN comprises establishing a connection between the BAN enabled communication device and a control device for controlling the BAN enabled media experience device.

The control device may be a remote control for TV, joystick for gaming console, smart phone with app for controlling TV or radio etc. for remotely controlling the media experience device.

In some embodiments establishing a connection between the BAN enabled media experience device and the BAN enabled communication device by using BAN comprises establishing a connection between the BAN enabled communication device and a BAN enabled object.

The BAN enabled object may be furniture, such as a sofa, a table, a floor, e.g. comprising a touch enabled surface, and/or the object may be clothes and/or a remote control for controlling the media experience device etc. Thus hereby it can be detected if a BAN user watching a media experience leaves the room, which could change the recommendations for the media experience based on any remaining BAN users or NON-BAN users in the room.

The BAN enabled communication device may be on a list of BAN enabled communications devices which the BAN enabled object is preconfigured to be connected to.

The connection may be established by the user touching or being near the BAN enabled object, such as touching the table, sitting in the sofa, walking on the floor, picking up the remote control etc.

In some embodiments, the predefined user configuration is configured to be stored in a remote storage.

Thus the user configuration/settings may be stored remotely, such as in a remote data storage, such as in a remote storage area network, such as in a cloud data storage remote storage.

The user configuration may be accessed or configured or changed by accessing the user configuration profile on a pc, a tablet or a smart phone and typing in or clicking on preferences etc.

The user configuration may be set up by the user and/or by the provider of the BAN enabled communication device and/or by the provider of the BAN enabled media experience device.

In some embodiments, the predefined user configuration is configured to be stored in the BAN enabled communication device.

Thus this may correspond to a local storage.

In some embodiments, the stored, predefined user configuration associated with the userID of the BAN enabled communication device is configured to be retrieved from the remote storage.

In some embodiments, the stored, predefined user configuration associated with the userID of the BAN enabled communication device is configured to be retrieved from the BAN enabled communication device.

In some embodiments, retrieving the identification data, userID, of the BAN enabled communication device comprises sending a request for identification data, userID, of the BAN enabled communication device by using BAN.

The request may be send to a remote storage area network, such as in a cloud data storage remote storage or send locally to the BAN enabled communication device.

In some embodiments retrieving the identification data, userID, of the BAN enabled communication device comprises receiving the userID of the BAN enabled communication device.

The userID may be received from a remote storage area network, such as in a cloud data storage remote storage or received from a local storage in the BAN enabled communication device.

According to an aspect disclosed is a method, performed in a Body Area Network, BAN, enabled communication device for enabling transmission of a media experience in a BAN enabled media experience device according to a stored, predefined user configuration associated with a userID of the BAN enabled communication device, the BAN enabled media experience device being associated with an identification data, mediaID, the method comprising:

establishing a connection between the BAN enabled media experience device and the BAN enabled communication device by using BAN; and retrieving the identification data, mediaID, of the BAN enabled media experience device.

Thus the BAN enabled communication device may retrieve identification data, mediaID, of the BAN enabled media experience device.

In some embodiments retrieving the identification data, mediaID, of the BAN enabled media experience device comprises sending a request for identification data, mediaID, of the BAN enabled media experience device by using BAN.

The request may be sent to a remote storage area network, such as in a cloud data storage remote storage or sent locally to the BAN enabled media experience device.

In some embodiments, retrieving the identification data, mediaID, of the BAN enabled media experience device comprises receiving the mediaID of the BAN enabled media experience device.

The mediaID may be received from a remote storage area network, such as in a cloud data storage remote storage or received from a local storage in the BAN enabled media experience device.

According to an aspect, disclosed is a Body Area Network, BAN, enabled media experience device configured for being connected with a BAN enabled communication device, wherein said BAN enabled media experience device comprising:
- a detector unit configured for detecting the presence of a human body;
- a radio communication interface configured to communicate with said BAN enabled communication device;
- a media transmission interface configured for transmitting the media experience;
- a processing circuitry configured to:
    - broadcast a signal, indicating an ability to connect to the BAN enabled communication device and/or transmit a media experience, when said detector unit detects the presence of a human body;
    - transmit identification data, mediaID, associated with the BAN enabled media experience device to the BAN enabled communication device, when a request for media ID is received;
    - receive, using the radio communication interface, userID from said BAN enabled communication device.

The media transmission interface configured for transmitting the media experience may be a screen, a display, an audio source etc.

The Body Area Network, BAN, enabled media experience device configured for being connected with a BAN enabled communication device may be configured for performing the method according to disclosure and the embodiments.

In some embodiments said object comprises an electronic module.

In some embodiments, said electronic module comprises said detector unit, said radio communication unit, said processing circuitry and said data storage.

According to an aspect, disclosed is a system comprising a Body Area Network, BAN, enabled media experience device and at least one Body Area Network, BAN, enabled communication device, wherein said system is configured for connection of the BAN enabled media experience device with the at least one BAN enabled communication device, wherein said BAN enabled media experience device comprises:
- a detector unit configured for detecting the presence of a human body;
- a radio communication interface configured to communicate with said BAN enabled communication device;
- a media transmission interface configured for transmitting the media experience;
- a processing circuitry configured to:
    - send a signal, indicating an ability to connect to the BAN enabled communication device and/or transmit a media experience, when said detector unit detects the presence of a human body;
    - transmit identification data, mediaID, associated with the BAN enabled media experience device to the BAN enabled communication device, when a request for mediaID is received;
    - receive, using the radio communication interface, mediaID from said BAN enabled communication device.

The media transmission interface configured for transmitting the media experience may be a screen, a display, an audio source etc.

The system comprising a Body Area Network, BAN, enabled media experience device and at least one Body Area Network, BAN, enabled communication device may be configured for performing the method according to disclosure and the embodiments.

The method according to the disclosure and the embodiments of the method may be configured to be performed in a device and/or in a system according to the aspects above.

The features of the above-mentioned embodiments can be combined in any combinations.

BRIEF DESCRIPTION OF THE DRAWINGS

Further aspects, features and advantages of the present invention will appear from the following detailed description of the invention, wherein embodiments of the invention will be described in more detail with reference to the accompanying drawings, in which:

FIG. 6 shows an example of a stored, predefined user configuration associated with an identification data, userID, of a BAN enabled communication device;

DETAILED DESCRIPTION

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

As used herein, the term "mobile device" includes mobile communication device and mobile radio communication equipment. Portable communication devices and mobile communication devices may be used synonymously. The term "mobile device" may be referred to below as a mobile phone (or as a mobile telephone, portable phone or portable telephone), a portable device, a portable radio terminal or a portable terminal, which includes all electronic equipment, but not limited to, capable of being used for voice and/or data communication.

As will be appreciated, the invention may be used with mobile phones, other phones, smartphones, personal digital assistants (PDAs), computers, tablets, other electronic communication devices, etc., for brevity, the invention will be described by way of examples with respect to mobile phones, but it will be appreciated that the invention may be used with other electronic communication devices.

A body area network, BAN, also referred to as a wireless body area network, WBAN or body sensor network, SSN, is a wireless network of wearable communication devices. BAN enabled devices may be embedded inside the body, implants, may be surface-mounted on the body in a fixed position or may be accompanied devices which humans can carry in different positions, in clothes pockets, by hand or in various bags.

More and more devices get support for Body Area Network, BAN, defined by IEEE 802.15. The first devices have their background in the medical area, as BAN is a communication standard optimized for low power devices and operation on, in or around the human body. BAN makes it possible to communicate when normally 2 m or less between the devices over the body. Operation is in global, license-exempt band like 2.4 MHz. Peer-to-Peer, and Point to Multi-point communication can be established and it contains efficient sleep modes. Today, a maximum of 100 BAN enabled devices can be connected and there is a network density limit of 2-4 networks/m$^2$.

Figure 1:
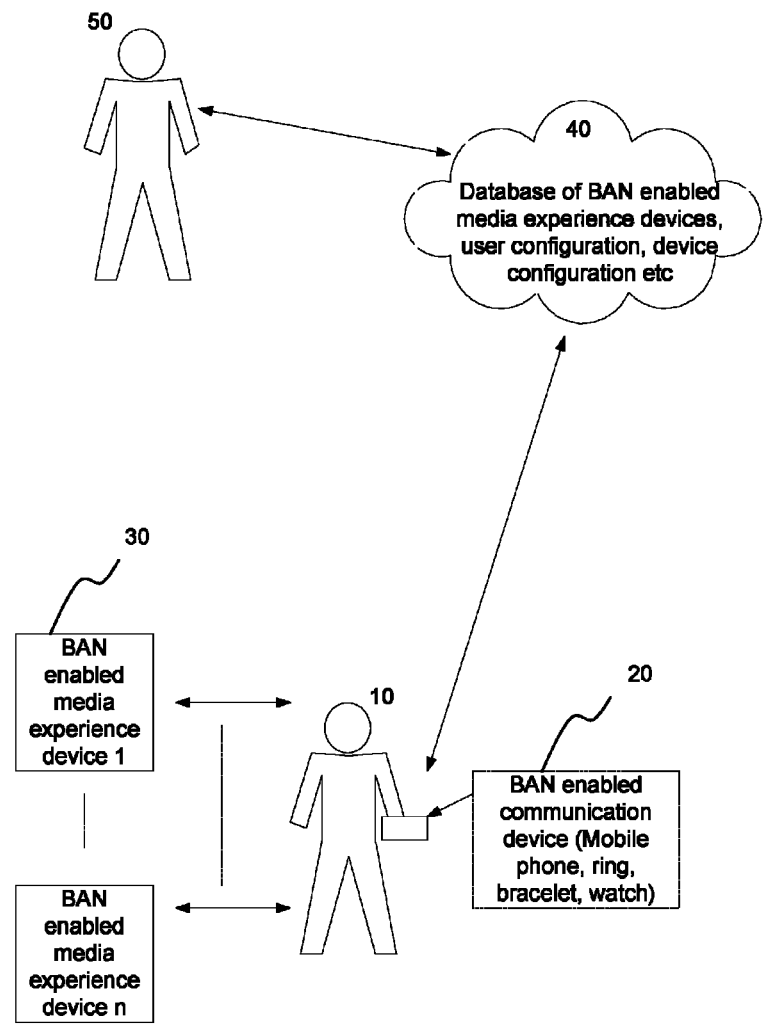
FIG. 1 shows a system comprising a BAN enabled media experience device and a BAN enabled communication device according to the disclosure.
Figure 4:
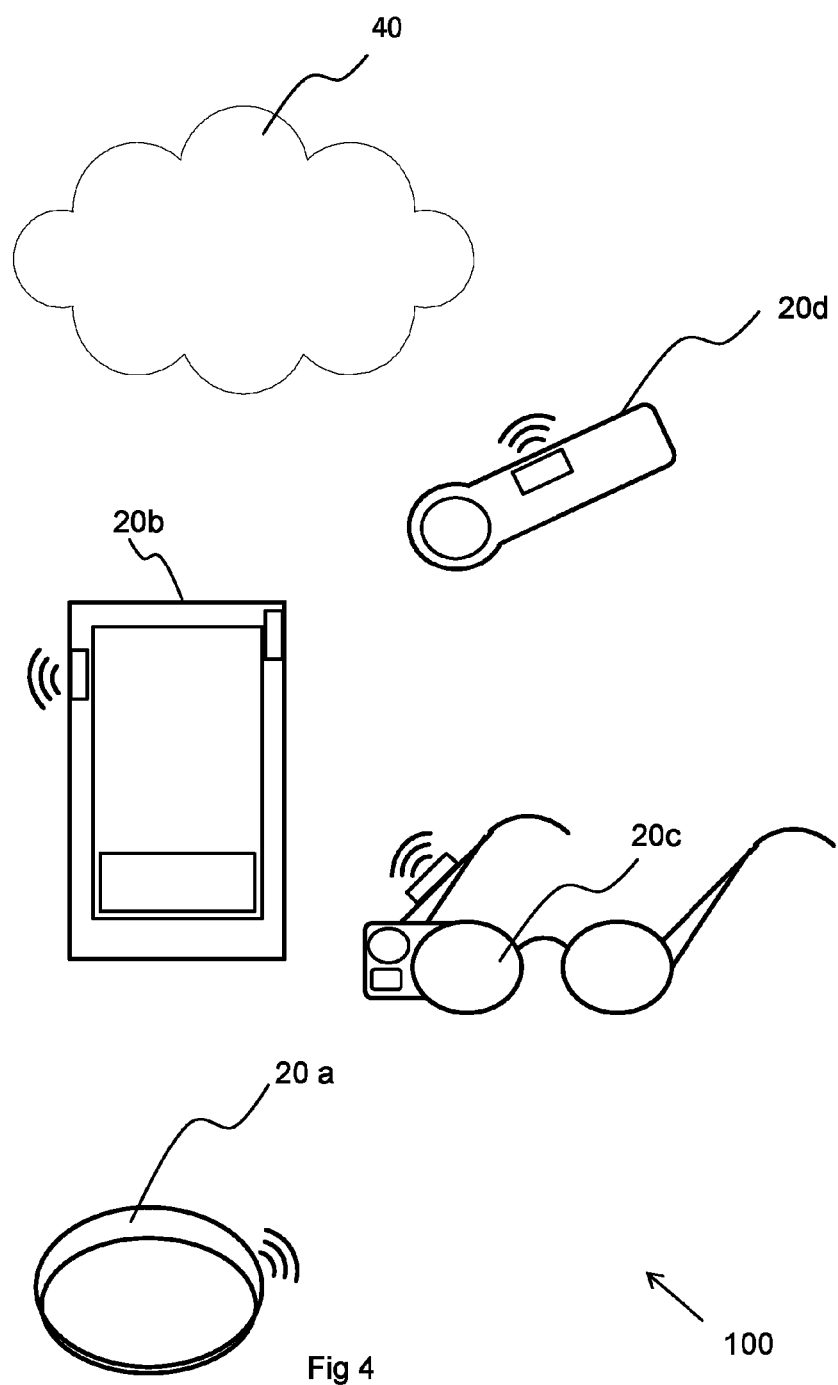
FIG. 4 shows exemplary embodiments of BAN enabled communication devices according to the disclosure.

Referring in detail to the drawings, and initially to FIG. 1, a wearable BAN enabled communication device in accordance with an embodiment of the present invention is illustrated generally at 20, 20a, 20b, 20c, 20d. A wearable BAN enabled communication device 20, 20a, 20b, 20c, 20d in this application refers to a communication device configured to be worn by a person. Examples of such wearable BAN enabled communication devices are shown in FIG. 4, such as BAN enabled accessories i.e. a wristlet 20a, an in-ear hearing device 20d, goggles/glasses 20c or a BAN enabled mobile phone 20b. The wearable BAN enabled communication device 20, 20a, 20b, 20c, 20d will be referred to below as a BAN enabled device 20, 20a, 20b, 20c, 20d.

A BAN enabled media experience device in accordance with an embodiment of the present invention is illustrated generally at 30. A BAN enabled media experience device 30 in this application refers to any media experience device equipped with a BAN electronic circuit to be touched by a user, e.g. a TV, a shared media experience device, a media streaming device, an audio streaming device, a media service device, a screen, a touch screen, a tablet, a computer, a PC, a video conference device, a virtual reality device, a head-mounted display, a visor, a gaming console, a touch-enabled surface such as a table etc. for being connected to a BAN enabled communication device 20, 20a, 20b, 20c, 20d.

Figure 2:
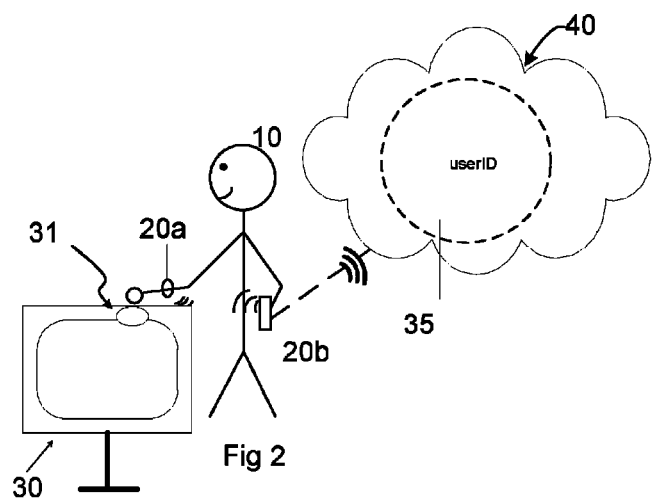
FIG. 2 illustrates a user wearing at least a first and a second BAN enabled communication devices in one scenario of how the present invention can be implemented.

In one embodiment a user 10 is wearing at least two BAN enabled devices, as shown in FIG. 2, a first BAN enabled device 20a, which may be a BAN enabled accessory such as a headset, watch, bracelet or a ring, and a second BAN enabled device 20b, which may be a mobile phone. A BAN connection is created between the BAN enabled accessory 20a and the mobile phone 20b, where the mobile phone communicates a user ID 35, IP/session ID, login etc., as security key data, userID, to the BAN enabled accessory 20a over the BAN. The user ID 35, IP/session ID, login etc. may be retrieved from a remote storage, such as a cloud storage 40.

Figure 3:
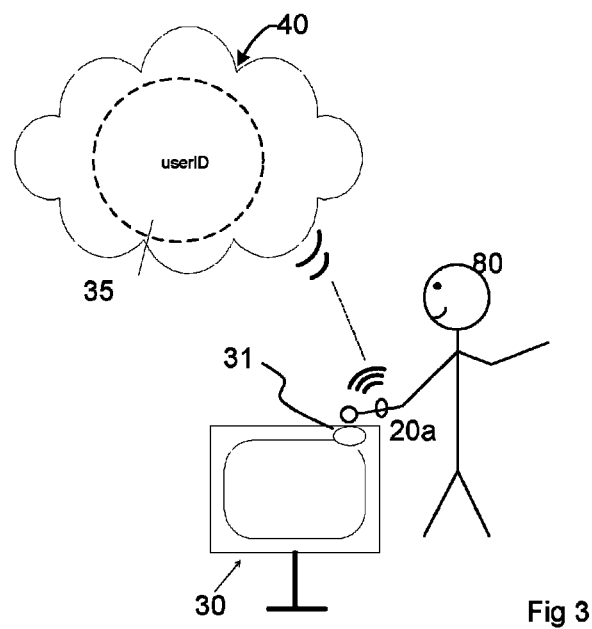
FIG. 3 illustrates a user wearing one BAN enabled communication device in one scenario of how the present invention can be implemented.

In one embodiment a user is wearing a BAN enabled device 20a, as shown in FIG. 3, which may be a BAN enabled accessory or a BAN enabled mobile phone. The BAN enabled device 20a can also contain additional communication channels, like Bluetooth Low Energy (BLE), WiFi, etc. to be able to setup a direct connection towards a cloud service 40, as shown in FIG. 1.

In one embodiment transmission of a media experience according to a stored, predefined user configuration associated with an identification data, userID 35, of the BAN enabled communication device may be created by touching at least one BAN enabled media experience device 30, e.g. a TV, by a user 10, 80. A tremor signal, indicating the presence of a human body, the user, is detected by a detector unit provided in, on or at the BAN enabled media experience device, thus confirming that there is a BAN available. Since the TV is BAN enabled it will connect to the BAN enabled mobile phone 20b directly or via the BAN enabled accessory 20a by using BAN. The media experience device 30 connects by sending a mediaID to the BAN enabled device 20a, 20b. The user may be asked by the BAN enabled device 20a, 20b through a user interface of the BAN enabled device or by interacting with the BAN enabled device in some other way, such as pressing a button, touching a touchpad etc. to confirm that connection with the BAN enabled media experience device should be established, and/or to confirm that the recommendations, the media experience recommendations, should be accepted and thus transmitted on the media experience device.

The method will now be described starting from FIG. 2 disclosing method steps, performed in a wearable BAN enabled communication device 20, such as a ring, bracelet, watch, tag, mobile phone, tablet, pad, which may be connected to another wearable BAN enabled communication device or may be connected to a cloud service through BAN, BLE, WiFi, for enabling transmission of a media experience on a BAN enabled media experience device 30 according to a stored, predefined user configuration associated with an identification data, userID, of the BAN enabled communication device 20. When the described steps are not dependent on each other, these steps may be implemented in any combination.

Figure 5:
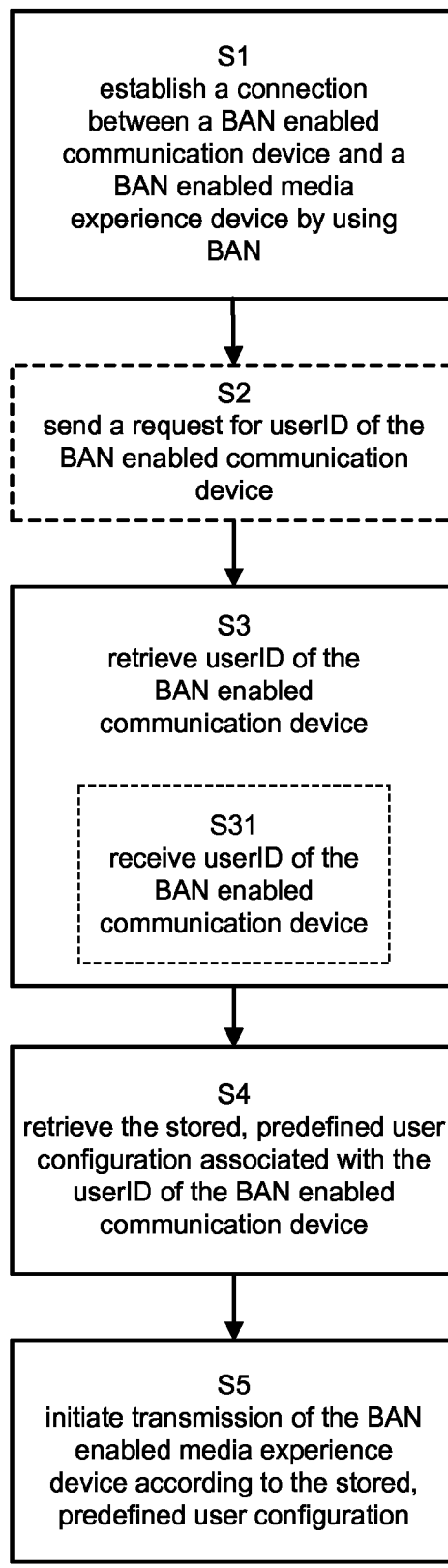
FIG. 5 shows a flow chart of the method performed in a BAN enabled media experience device according to the disclosure.

FIG. 5 shows a flow chart of the method performed in a BAN enabled media experience device configured for enabling transmission of a media experience according to a stored, predefined user configuration associated with an identification data, userID, of a BAN enabled communication device.

In step S1 a connection is established between the BAN enabled media experience device and the BAN enabled communication device by using BAN.

In step S2, which is optional, a request for userID of the BAN enabled communication device is sent.

In step S3, the identification data, userID, of the BAN enabled communication device is retrieved.

In step S31, which is optional, a userID of the BAN enabled communication device is received.

In step S4, the stored, predefined user configuration associated with the userID of the BAN enabled communication device is retrieved.

In step S5, transmission of the media experience by the BAN enabled media experience device according to the stored, predefined user configuration is initiated.

FIG. 6 shows an example of a stored, predefined user configuration associated with an identification data, userID, of a BAN enabled communication device. The user configuration may comprise various information details about the user, which the user may have filled in or completed, such as name; age; gender; language; country; religion; favourite TV shows, such as TV shows available on a TV channel; favourite setup box shows, such as shows available on a setup box connection, such as Netflix, Video Unlimited, HBO etc.; general preferences such as animal shows, science shows, news shows; recommendations, such as recommendations from the setup box provider etc.

Figure 7:
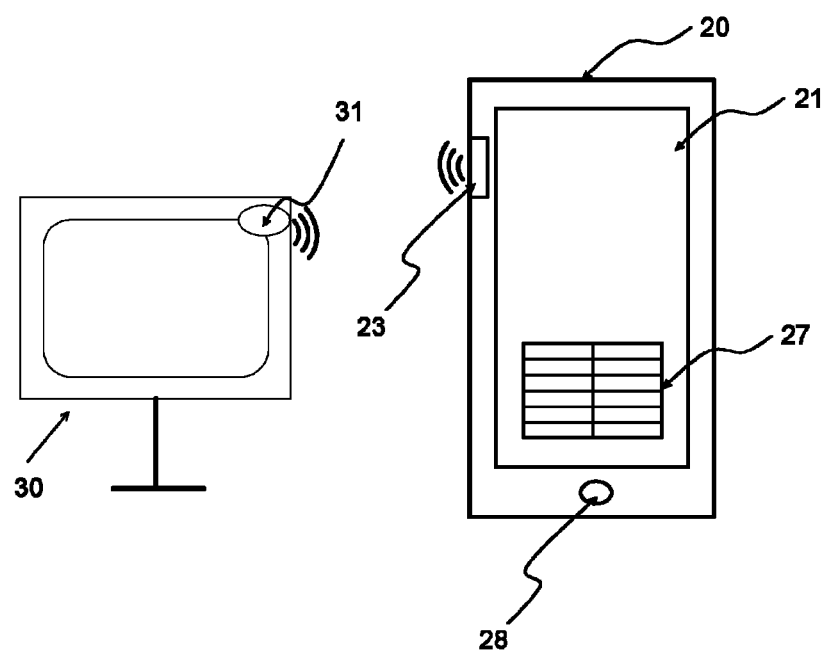
FIG. 7 shows a system comprising a BAN enabled media experience device and a BAN enabled communication device according to the disclosure.
Figure 8:
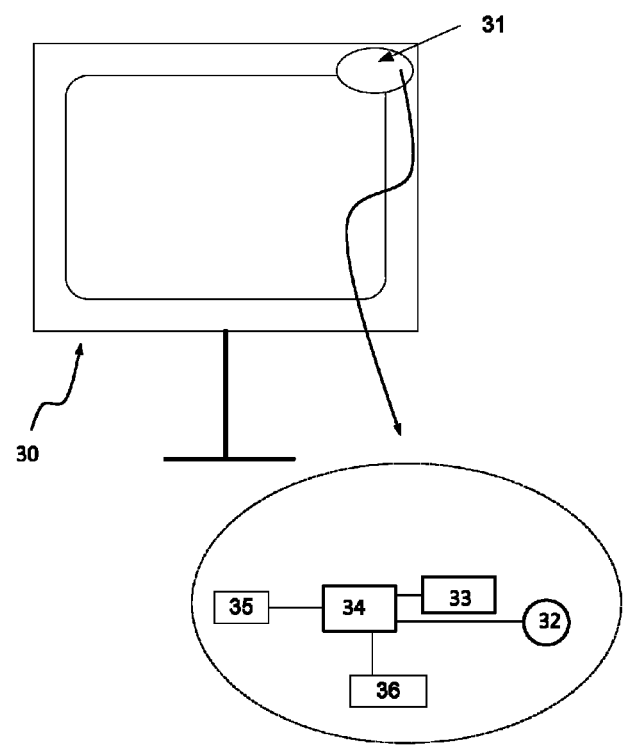
FIG. 8 shows a BAN enabled media experience device according to the disclosure.

FIGS. 7 and 8 show a Body Area Network, BAN, enabled media experience device 30, associated with a communication device 20, which will now be described in further detail, configured for enabling transmission of a media experience according to a stored, predefined user configuration associated with an identification data, userID, of a BAN enabled communication device. The BAN enabled media experience device may be any media experience device and a TV is shown in FIGS. 7 and 8 only as an exemplary object. The BAN enabled media experience device is equipped with a BAN electronic module 31. The electronic module 31 may be designed as tag to be permanently attached to the media experience device or to be removed from the media experience device 30 and put on another object. The BAN electronic module 31 can also be designed a patch or any adhesive or sticking piece of paper or plastic.

FIG. 8 shows the BAN electronic module 31 as a hatched area. The BAN electronic module comprises a detector unit 32 configured for detecting a tremor signal which indicates the presence of a human body. The detector unit can be a sensor of any kind such as an accelerator, optical sensor, temperature sensor, pulse sensor or the like.

In one embodiment, the detector unit 32 comprises a capacitive touch system. The capacitive sensor system has low power consumption, which is less than 30 micro Amperes, when the electronic module is touched. The sensitive range may be set to the range of 20-30 mm. The capacitive sensor system is always active. As soon as the user touches the BAN electronic module the detector unit starts to sense the presence of a human body.

In one embodiment, the detector unit 32 comprises an accelerometer, which can detect a tremor signal from the user. A tremor signal is a signal indicating the human quiver or tremble movement and the tremor signal is always present in human muscles at a frequency of 8-12 Hz.

In one embodiment, the detector unit comprises a pulse sensor, which can detect the heart rate or blood pulse of the user.

In one embodiment, the detector unit comprises a temperature sensor, which can detect the temperature of the skin of the user.

In one embodiment, the detector unit comprises an optical sensor, which can detect the temperature of the skin of the user.

The electronic module 31 further comprises a radio communication interface 33 configured to communicate with a BAN enabled communication device 20 by using BAN.

The electronic module 31 further comprises a data storage 35 configured to store the received mediaID.

FIGS. 1, 2, 3 and 7 shows a BAN enabled communication device, which now will be described in further detail. The BAN enabled communication device may be a BAN enabled accessory 20a, 20d or a mobile device.

In one embodiment the BAN enabled communication device is a mobile device, as shown in FIGS. 2, 3 and 7, e.g. a mobile phone. The mobile phone 20 comprises a controller, DTL, or a processing circuitry 22 that may be constituted by any suitable Central Processing Unit, CPU, microcontroller, Digital Signal Processor, DPS, etc. capable of executing computer program code for executing the method disclosed. However, the method may as well be hardware implemented or a combination of hardware and software. The computer program may be stored in a memory, MEM, not shown. The memory can be any combination of a Read and Write memory, RAM, and a Read only Memory, ROM. The memory may also comprise persistent storage, which for example, can be any single one or combination of magnetic memory, optical memory, or solid state memory or even remotely mounted memory.

The mobile phone 20 further comprises a wireless communication interface (i/f) 23 arranged for wireless communication with cellular communication systems and/or other wireless communication systems. The wireless communication interface may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The mobile phone further comprises an input unit 27, such as a keyboard, microphone 28 and a display unit 21.

The electronic module further comprises a controller 34. The controller is configured to execute the method according to the disclosure. The controller is typically a processing circuitry 34 configured for executing computer code, such as a computer program implementing the proposed method. One example is that the computer code is an application, which may be downloaded from an external server. However, the method may as well be hardware implemented or a combination of hardware and software. The controller 34 is configured to broadcast a signal, indicating ability to connect to the BAN enabled communication device and/or transmit a media experience, when said detector unit 32 detects the presence of a human body. The controller 34 is configured to transmit identification data, mediaID, associated with the media experience device 30 to the communication device 20, when a request for mediaID is received. Further the controller is configured to receive, using the radio communication interface 33, mediaID from said communication device 20. The controller 34 is configured to store, in the data storage 35, the received mediaID.

In one aspect, the controller 34 is further configured to transmit position data to the communication device 20.

In one aspect, the controller 34 is further configured to transmit property data to the communication device 20.

In one aspect, the BAN enabled object further comprises a battery 36. The battery may be positioned in the electronic module or at any other position on the object.

In one embodiment, the BAN enabled communication device is a BAN enabled accessory, as shown in FIGS. 2 and 4. The BAN enabled accessory comprises a detector unit, a controller unit and a communication unit, not shown. The detector unit is configured for detecting a tremor signal which indicates the presence of a human body and movement of a body part. The communication unit is configured to communicate with a BAN enabled communication device by using BAN.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method, performed in a Body Area Network (BAN) enabled media experience device, comprising:
   storing a predefined user configuration associated with an identification data, userID, of a BAN enabled communication device;
   establishing a connection between the BAN enabled media experience device and the BAN enabled communication device by using BAN;
   retrieving the identification data, userID, of the BAN enabled communication device in response to the establishing of the connection between the BAN enabled media experience device and the BAN enabled communication device;
   retrieving the stored, predefined user configuration associated with the userID of the BAN enabled communication device; and
   initiating transmission of a media experience by the BAN enabled media experience device according to the stored, predefined user configuration.

2. The method according to claim 1, wherein the predefined user configuration comprises the user's media experience preferences.

3. The method according to claim 1, wherein initiating transmission of the media experience by the BAN enabled media experience device comprises providing recommendations according to the stored, predefined user configuration.

4. The method according to claim 1, wherein transmission of the media experience by the BAN enabled media experience device, according to the stored, predefined user configuration stops upon detection of one or more of:
   the BAN enabled media experience device is turned off or put on standby;
   another user establishes a connection between the BAN enabled media experience device and another BAN enabled communication device associated with another identification data, userID, for enabling transmission of a media experience according to another stored, predefined user configuration, by using BAN;
   the connection between the BAN enabled media experience device and the BAN enabled communication device is turned off or lost; or
   a connection between another BAN enabled media experience device and the BAN enabled communication device is established by using BAN.

5. The method according to claim 1, wherein the method comprises:
   establishing a connection between the BAN enabled media experience device and another BAN enabled communication device by using BAN;
   retrieving identification data, userID, of the other BAN enabled communication device;
   retrieving a stored, predefined shared user configuration associated with the userID of the BAN enabled communication device and the userID of the other BAN enabled communication device; and
   initiating transmission of the media experience by the BAN enabled media experience device according to the stored, predefined shared user configuration.

6. The method according to claim 1, wherein establishing a connection between the BAN enabled media experience device and the BAN enabled communication device by using BAN comprises establishing a connection between the BAN enabled communication device and a control device for controlling the BAN enabled media experience device.

7. The method according to claim 1, wherein establishing a connection between the BAN enabled media experience device and the BAN enabled communication device by using BAN comprises establishing a connection between the BAN enabled communication device and a BAN enabled object.

8. The method according to claim 1, wherein the predefined user configuration is stored in a remote storage.

9. The method according to claim 8, wherein the stored, predefined user configuration associated with the userID of the BAN enabled communication device is retrieved from the remote storage.

10. The method according to claim 1, wherein the predefined user configuration is stored in the BAN enabled communication device.

11. The method according to claim 10, wherein the stored, predefined user configuration associated with the userID of the BAN enabled communication device is retrieved from the BAN enabled communication device.

12. The method according to claim 1, wherein retrieving the identification data, userID, of the BAN enabled communication device comprises sending a request for identification data, userID, of the BAN enabled communication device by using BAN.

13. The method according to claim 1, wherein retrieving the identification data, userID, of the BAN enabled communication device comprises receiving the userID of the BAN enabled communication device.

14. The method according to claim 1, wherein the BAN enabled media experience device is associated with an identification data, mediaID, the media ID retrieved and transmitted to the BAN enabled communication device using BAN.

15. The method according to claim 1, further comprising detecting a tremor signal indicating presence of a user of the BAN enabled communication device and that BAN between the BAN enabled media experience device and the BAN enabled communication device is available.

16. The method according to claim 1, wherein the BAN enabled communication device is one of a plurality of devices that are preregistered on a list of allowed BAN enabled communications devices that the BAN enabled media experience device is preconfigured to connect to.

17. A Body Area Network (BAN) enabled media experience device configured for being connected with a BAN enabled communication device, wherein said BAN enabled media experience device comprising:
   a detector unit configured for detecting a tremor signal indicating presence of a user of the BAN enabled communication device and that BAN between the BAN enabled media experience device and the BAN enabled communication device is available;
   a radio communication interface configured to communicate with said BAN enabled communication device;
   a media transmission interface configured for transmitting the media experience; and
   a processing circuitry configured to:
      broadcast a signal, indicating an ability to connect to the BAN enabled communication device and/or transmit a media experience, in response to the detector unit detecting the tremor signal;
      transmit identification data, mediaID, associated with the BAN enabled media experience device to the BAN enabled communication device, when a request for mediaID is received; and receive, using the radio communication interface, userID from said BAN enabled communication device.

18. The media experience device according to claim 17, wherein said BAN enabled media experience device comprises an electronic module.

19. The media experience device according to claim 18, wherein said electronic module comprises said detector unit, said radio communication unit, said processing circuitry and said data storage.

20. A system comprising a Body Area Network (BAN) enabled media experience device and at least one Body Area Network, BAN, enabled communication device, wherein said system is configured for connection of the BAN enabled media experience device with the at least one BAN enabled communication device, wherein said BAN enabled media experience device comprises:

a detector unit configured for detecting a tremor signal indicating presence of a user of the BAN enabled communication device and that BAN between the BAN enabled media experience device and the BAN enabled communication device is available;

a radio communication interface configured to communicate with said BAN enabled communication device;

a media transmission interface configured for transmitting the media experience; and a processing circuitry configured to:

send a signal, indicating an ability to connect to the BAN enabled communication device and/or transmit a media experience, in response to the detector unit detecting the tremor signal;

transmit identification data, mediaID, associated with the BAN enabled media experience device to the BAN enabled communication device, when a request for mediaID is received; and receive, using the radio communication interface, mediaID from said BAN enabled communication device.

* * * * *